United States Patent
Qiu et al.

(10) Patent No.: US 12,293,421 B2
(45) Date of Patent: *May 6, 2025

(54) METHOD, APPARATUS, DEVICE AND STORAGE MEDIUM FOR CONTENT PRESENTATION

(71) Applicant: Douyin Vision Co., Ltd., Beijing (CN)

(72) Inventors: Hao Qiu, Beijing (CN); Xin Xie, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,075

(22) Filed: Apr. 26, 2024

(65) Prior Publication Data

US 2024/0296506 A1     Sep. 5, 2024

Related U.S. Application Data

(63) Continuation of application No. 18/195,774, filed on May 10, 2023, now Pat. No. 12,002,114.

(30) Foreign Application Priority Data

Oct. 17, 2022  (CN) .......................... 202211744288.4

(51) Int. Cl.
G06F 3/0482  (2013.01)
G06F 16/958  (2019.01)
G06Q 50/00  (2012.01)

(52) U.S. Cl.
CPC .......... *G06Q 50/01* (2013.01); *G06F 16/958* (2019.01)

(58) Field of Classification Search
None
See application file for complete search history.

(56) References Cited

U.S. PATENT DOCUMENTS 8,375,068 B1 * 2/2013 Platt ....................... G06Q 10/10
                                                        705/7.29
9,936,012 B2 * 4/2018 Park ..................... G06Q 10/101
10,007,955 B2 * 6/2018 Stibel .................. G06F 3/04883
(Continued)

FOREIGN PATENT DOCUMENTS

AU    2014200195 A1    7/2014
AU    2015201759 A1    10/2015
(Continued)

OTHER PUBLICATIONS

International Search Report and Written Opinion in PCT/CN2023/124103, mailed Dec. 25, 2023, 8 pages.

*Primary Examiner* — Hassan Mrabi
(74) *Attorney, Agent, or Firm* — Astute IP Law Group

(57) ABSTRACT

According to embodiments of the present disclosure, a method, apparatus, device and storage medium for content presentation are provided. The method comprises presenting, in a first display region of a content presentation page of an application, at least a portion of a first set of content items along a first arrangement orientation. The method further comprises presenting, in a second display region of the content presentation page of the application different from the first display region, at least a portion of a second set of content items along a second arrangement orientation different from the first arrangement orientation.

20 Claims, 8 Drawing Sheets

(56) References Cited

U.S. PATENT DOCUMENTS

| | | | | |
|---|---|---|---|---|
| 10,163,173 | B1* | 12/2018 | McKinley | G06F 3/0484 |
| 10,684,738 | B1* | 6/2020 | Sicora | G06F 3/0485 |
| 10,891,664 | B2* | 1/2021 | Fang | G06Q 30/0282 |
| 11,409,409 | B1* | 8/2022 | Sicora | G06F 16/435 |
| 11,644,947 | B1* | 5/2023 | Sicora | G06F 3/0482 |
| | | | | 715/764 |
| 2015/0256499 | A1* | 9/2015 | Kumar | G06Q 10/107 |
| | | | | 707/755 |
| 2015/0365306 | A1* | 12/2015 | Chaudhri | H01L 29/42324 |
| | | | | 715/753 |
| 2016/0117782 | A1* | 4/2016 | Stibel | G06Q 50/01 |
| | | | | 705/319 |
| 2016/0246801 | A1* | 8/2016 | Fleischman | H04N 21/4826 |
| 2016/0350953 | A1* | 12/2016 | Mittelstaedt | H04L 51/043 |
| 2017/0017616 | A1 | 1/2017 | Elings et al. | |
| 2017/0221156 | A1* | 8/2017 | Mingarelli | H04L 51/222 |
| 2018/0032558 | A1* | 2/2018 | Oliner | G06F 16/43 |
| 2018/0052837 | A1* | 2/2018 | Kunieda | G06F 16/40 |
| 2018/0150392 | A1 | 5/2018 | Booss et al. | |
| 2018/0164990 | A1* | 6/2018 | Lin | G06Q 50/01 |
| 2018/0189837 | A1* | 7/2018 | Panchaksharaiah | |
| | | | | G06Q 30/0264 |
| 2020/0004394 | A1 | 1/2020 | Li et al. | |
| 2020/0267435 | A1* | 8/2020 | Gordon | H04N 21/8586 |
| 2021/0042724 | A1* | 2/2021 | Rathod | G07G 1/0054 |
| 2022/0182699 | A1* | 6/2022 | Gordon | H04N 21/251 |
| 2022/0374849 | A1* | 11/2022 | Rathod | G07G 1/0036 |
| 2023/0046839 | A1* | 2/2023 | Raleigh | H04M 15/83 |
| 2023/0083474 | A1* | 3/2023 | Privitelli | G06Q 30/0631 |
| | | | | 715/753 |
| 2023/0229288 | A1* | 7/2023 | Sicora | G06F 3/0482 |
| | | | | 715/764 |

FOREIGN PATENT DOCUMENTS

| | | |
|---|---|---|
| AU | 2015274341 A1 | 10/2016 |
| CA | 2761911 C | 11/2010 |
| CN | 102693260 A | 9/2012 |
| CN | 103677529 A | 3/2014 |
| CN | 104756503 A | 7/2015 |
| CN | 106612229 A | 5/2017 |
| CN | 104380334 A | 2/2019 |
| CN | 109446348 A | 3/2019 |
| CN | 109983455 A | 7/2019 |
| CN | 111601139 A | 8/2020 |
| CN | 113079244 A | 7/2021 |
| CN | 113111195 A | 7/2021 |
| CN | 107808346 B | 8/2021 |
| CN | 114205635 A | 3/2022 |
| WO | 2022090841 A1 | 5/2022 |

\* cited by examiner

METHOD, APPARATUS, DEVICE AND STORAGE MEDIUM FOR CONTENT PRESENTATION

CROSS-REFERENCE TO RELATED APPLICATION(S)

This application is a continuation of U.S. patent application Ser. No. 18/195,774 filed on May 10, 2023, entitled "METHOD, APPARATUS, DEVICE AND STORAGE MEDIUM FOR CONTENT PRESENTATION", which claims priority to and benefits of Chinese Patent Application No. 202211744288.4, filed on Oct. 17, 2022, both of which are hereby incorporated by reference in their entireties.

TECHNICAL FIELD

Example embodiments of the present disclosure generally relate to the field of computer technology, and specifically, to a method, apparatus, device and computer-readable storage medium for content presentation.

BACKGROUND

More applications are currently designed to provide various services to users. Users may use content sharing applications to view, comment and repost various contents such as multimedia contents including videos, pictures, picture collections, sound, and so on. For example, a user may view a content shared by other users followed by the user in a content sharing application. Application providers expect to present richer and more interesting contents. In this way, the platform can not only provide more and various types of shared contents, but also increase the user stickiness of applications.

SUMMARY

In a first aspect of the present disclosure, a method for content presentation is provided. The method comprises presenting, in a first display region of a content presentation page of an application, at least a portion of a first set of content items along a first arrangement orientation. The method further comprises presenting, in a second display region of the content presentation page of the application different from the first display region, at least a portion of a second set of content items along a second arrangement orientation different from the first arrangement orientation.

In a second aspect of the present disclosure, an electronic device is provided. The device comprises at least one processing unit; a first camera and a second camera; and at least one memory coupled to at least one processing unit and storing instructions for execution by at least one processing unit. The instructions, when executed by the at least one processing unit, cause the device to perform a method according to the first aspect.

In a third aspect of the present disclosure, a computer-readable storage medium is provided. A computer program is stored on the medium, which, when executed by a processor, implements a method according to the first aspect.

It is to be understood that the Summary is neither intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
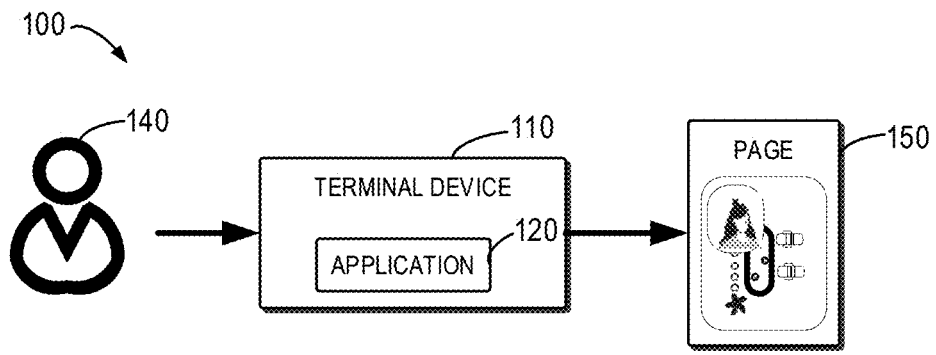
FIG. 1 illustrates a schematic view of an example environment in which embodiments of the present disclosure can be implemented.

Embodiments of the present disclosure will be described in more detail with reference to the accompanying drawings, in which some embodiments of the present disclosure have been illustrated. However, it is to be understood that the present disclosure can be implemented in various manners, and thus should not be construed to be limited to embodiments disclosed herein. On the contrary, those embodiments are provided for the thorough and complete understanding of the present disclosure. It is to be understood that the drawings and embodiments of the present disclosure are merely for the purpose of illustration, rather than limiting the protection scope of the present disclosure.

In the description of the embodiments of the present disclosure, the term "includes" and its variants are to be read as open terms that mean "includes, but is not limited to." The term "based on" is to be read as "based at least in part on." The terms "one embodiment" or "the embodiment" are to be read as "at least one embodiment." The term "some embodiments" is to be read as "at least some embodiments." Other definitions, either explicit or implicit, may be included below.

As used herein, the term "in response to" refers to a state in which a corresponding event occurs or a state that is satisfied. It is to be understood that execution times of subsequent actions executed in response to an event or condition may not be strongly related to a time point at which the event occurs or a condition is established. For example, in some cases, subsequent actions may be executed immediately if an event occurs or a condition is met. In other cases, subsequent actions may be executed after a period of time after the event occurs or the condition is met.

As used herein, the term "image" may refer to multimedia content such as a static image or picture (e.g., photo), a dynamic image or picture (e.g., video) and the like. As used hereinafter, unless stated explicitly, the term "picture" refers to static picture. In some embodiments, the image may comprise audio information or the like. The image may be taken by a single camera or composited from a plurality of images taken by a plurality of cameras.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various embodiments of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 illustrates a schematic view of an example environment 100 in which the embodiments of the present disclosure can be implemented. In the example environment 100, an application 120 is installed in a terminal device 110. A user 140 may interact with the application 120 via the terminal device 110 and/or a device attached to the terminal device 110. The application 120 may be a content sharing application that can provide the user 140 with various services related to multimedia content, such as work browsing, commenting, reposting, creating (e.g., shooting and/or editing) and posting multimedia content. As used herein, "multimedia content" may be content in various forms, including videos, audios, pictures, picture collections, text, etc.

In the environment 100 of FIG. 1, if the application 120 is in active state, the terminal device 110 may present a page 150 of the application 120. The page 150 may be presented in a graphical user interface (GUI). The GUI may be located in a display component of the terminal device 110, or located in an external display component communicatively connected to the terminal device 110. Scope of the present disclosure is not limited in this regard.

In some embodiments, the page 150 may include various pages which the application 120 may provide, such as a multimedia content presenting page, a content creating page, a content post page, a message page, a personal page, etc. The application 120 may provide a content creating function to shoot and/or creating multimedia content, so that the user 140 can edit the taken or uploaded multimedia content, etc. The application 120 may further have a post function to allow the user 140 to post the created multimedia content.

In some embodiments, the terminal device 110 communicates with a server 130 to provide services of the application 120. The terminal device 110 may be any type of mobile, fixed or portable terminal, including a mobile phone, a desktop computer, a laptop computer, a notebook computer, a netbook computer, a tablet computer, a media computer, a multimedia tablet, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. In some embodiments, the terminal device 110 can also support any type of interface (such as a "wearable" circuit, and the like) for the user 140. The server 130 is various types of computing system/server that can provide computing capability, including, without limitation to, a mainframe, an edge computing node, a computing device in a cloud environment, etc.

It is to be understood that the structures and functionalities of various elements in the environment 100 have been described only for the purpose of illustration, rather than limiting the scope of the present disclosure. In the environment 100, there may exist any number of servers and any number of terminal devices.

As aforementioned, more and more applications, such as content sharing applications, are designed to provide users with various services. Generally, some content sharing applications will present various multimedia content to users. For example, multimedia content may include content such as image, video, picture, picture set, sound, and the like.

Some conventional content sharing applications can display the content shared by a group of users who are followed by a current user of the application. For example, content sharing applications may display a group of contents shared by users who are followed by the current user in chronological order in the content presentation page. However, sometimes the current user may want to view not only contents shared by the users he or she follows, but also view contents shared by the current user himself or herself.

Other conventional content sharing applications can present contents shared by the current user and the users he or she follows. Such application usually presents the contents shared by the current user and the contents shared by the users he or she follows in a mixed way. For example, such application will mix the two types of contents and present them in chronological order. This content presentation method cannot distinguish the contents shared by the current user from the contents shared by other users, which is not convenient for retrieval. In addition, compared with the contents shared by the current user himself or herself, he or she may prefer to see the contents shared by the users he or she follows. This mixed presentation approach cannot meet the needs of the current user.

Moreover, since the screen size of a terminal device such as a mobile phone is usually small, it is difficult to arrange different content items to be concurrently displayed in the screen. The limitation of the screen size also limits the interactive capabilities of the content sharing applications.

Embodiments of this disclosure support the regional presentation of the content shared by the current user and the contents shared by users followed by the current user. As will be described below, according to embodiments of the present disclosure, the content shared by the current user is allowed to be displayed in one of the display regions of the content presentation page. In another display region of the content presentation page, the contents shared by a group of users who are followed by the current user are displayed. In this way, the content shared by the current user can be clearly distinguished from the contents shared by the users followed by the current user. In this way, a user-friendly content presentation page can be provided, and the content presentation effect can be improved.

According to some embodiments of the present disclosure, at least a portion of a first set of content items is presented in a first display region of a content presentation page of an application along a first arrangement orientation. At least a portion of a second set of content items is presented in a second display region of the content presentation page of the application different from the first display region, along a second arrangement orientation different from the first arrangement orientation. In this way, different set of content items can be presented in different regions of the content presentation page concurrently. By way of example, the content item(s) posted by a current user and content item(s) posted by a user(s) followed by the current user can be concurrently displayed in different display regions along different arrangement orientations.

According to some embodiments of the present disclosure, in response to a predetermined interactive operation along a predetermined orientation for the first or second display region, the first set of content items or the second set of content items is slidingly presented based on the predetermined orientation and a sorting of the first set of content items or the second set of content items. For example, in response to the predetermined interactive operation such as a user gesture or a finger sliding on the display screen along the first arrangement orientation for the first display region, the currently presented portion of the first set of content items is slidingly removed from the first displayed region, and another portion of the first set of content items is slidingly presented in the first display region along the first arrangement orientation. For another example, in response to the predetermined interactive operation along the second arrangement direction, the second set of content items can slidingly presented in the second display region. In this way, different content items can slide across the first display region following the predetermined interactive operation. User(s) can thus obtain richer information such as different content items on the small screen of the terminal device using different predetermined interactive operations. These flexible interactive operations enable providing user of richer information on the limited screen of the terminal device, and improve the efficiency of user interactions.

In addition, according to embodiments of the present disclosure, a size of the content shared by the current user is different from that of the content shared by the user followed by the current user. In this way, for example, if the current user pays more attention to the content shared by the users he/she follows, the size of the content shared by the current user can be smaller than the size of the content shared by the users he/she follows. Therefore, this flexible content presentation scheme can also better meet the needs of users, thereby improving the user experience.

Some example embodiments of the present disclosure will be described below with reference to the accompanying drawings.

Figure 2:
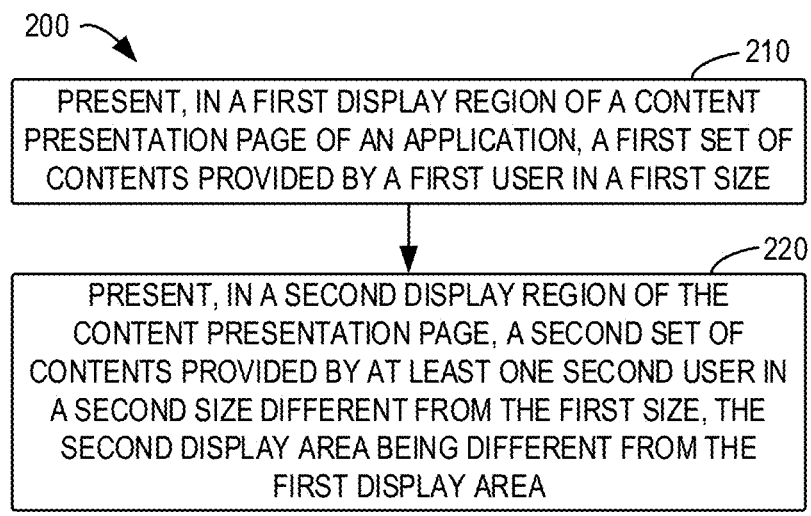
FIG. 2 illustrates a flowchart of a process for content presentation according to some embodiments of the present disclosure.

FIG. 2 illustrates a flowchart of a process 200 for content presentation according to some embodiments of the present disclosure. The process 200 can be implemented at the terminal device 120. For the sake of discussion, the process 200 will be described with reference to the environment 100 of FIG. 1. It is to be understood that the process 200 may include an additional act which is not shown and/or omit an act which is shown, and the scope of the present disclosure is not limited in this regard.

At block 210, the terminal device 110 presents, in a first display region of the content presentation page of the application 120, a first set of contents provided by a first user (e. g., user 140) in a first size. Unless otherwise noted, the first user is referred to as user 140 herein. The content shared by user 140 may be any appropriate multimedia content, including but not limited to image, video, picture, picture set, sound and other content. In some embodiments, the content may be an image captured or acquired by a user using a device such as a camera. The content may also be a composite image composited from a plurality of images. Additionally, or alternatively, in some embodiments, the content may also be a processed image obtained by editing an image or a composite image. For example, the content may be a blurred image or a blurred composite image. The scope of this disclosure is not limited in this respect.

In some embodiments, the first user is the current user of the application 120. Additionally, or alternatively, in other embodiments, the first user may be a user followed by the current user of the application 120, such as a specially following friend of the current user, and so on.

In some embodiments, the first set of contents may be contents shared by user 140 within a predetermined first period of time. The first time period may have any appropriate duration, such as one day, one week, one month, and so on. The first time period may be set by a system or specified by the user.

In some embodiments, the first set of content may be provided by the user 140 in response to a system message about sharing content. The system message may be displayed on any page of the terminal device 110. Examples of pages include but are not limited to home page, lock screen page, application page, and so on. The system message may prompt the user 140 to share content at a first time point. In embodiments where the user 140 is prompted by the system message to share content, the first time period may be a time period from the first time point indicated by the system message to the current time point.

At block 210, the terminal device 110 presents, in a second display region of the content presentation page different from the first display region, a second set of contents provided by at least one second user in a second size different from the first size. The first user and the second user are associated users in the application 120. In this way, the content provided by the current user can be presented while the content provided by the associated user is presented, so as to provide more rich and interesting content display.

In embodiments where the first user is the current user of the application 120, the second user may be the user that the current user follows in the application 120. Additionally, or alternatively, in embodiments where the first user is a user followed by a current user of the application 120, the second user may also be the current user or a specially following user different from the first user set by the current user. In the following description hereinafter, the first user is the current user 140 of the application 120, and the second user is the associated user of the user 140. However, it is to be understood that in some embodiments, the first user and the second user are interchangeable. The scope of this disclosure is not limited in this respect.

In some embodiments, the second size presented by the second set of contents is larger than the first size presented by the first set of contents. By presenting the content shared by the associated users in a larger size, it can meet the needs of users for preferably viewing the content shared by the following users.

In some embodiments, an association relationship between the associated user and the user 140 may be a social friend relationship. For example, the associated user and the user 140 may follow each other or be friends with each other in the application 120. The content shared by friends followed each other with the user 140 may be displayed in the second display region.

Alternately, or in addition, in some embodiments, the associated user may also be the user that the user 140 unilaterally follows in the application 120 or the user that unilaterally follows the user 140. The content shared by the associated users that the user 140 unilaterally follows and/or mutually follows may be displayed in the second display region. In such an embodiment, additional rules for presenting the second set of contents may also be set. For example, if the second user and user 140 follow each other, a detailed content shared by the second user is presented to user 140. On the contrary, if the user 140 unilaterally follows the second user or the second user unilaterally follows the user 140, the user 140 is presented with a blurred version of the content shared by the second user. In this way, the privacy of different users using the application 120 can be better protected.

Additionally, or alternatively, in some embodiments, associated users may be classified according to their intimate relationship or intimacy degree with the user 140. For example, associated users who are close to user 140 or who are specially followed by user 140 may be divided into the first group of associated users. In contrast, users who are not close to user 140, for example, users who have a unilateral following relationship with user 140 but do not a mutual following relationship user 140 may be divided into a second group of associated users. The second display region may display only the content shared by the first group of associated users, only the content shared by the second group of associated users, or the content shared by the first group and the second group of associated users. For example, the second set of contents displayed in the second display region may be selected according to the predetermined interaction of the user 140 or according to the system settings. It is to be understood that the associated user grouping methods listed above are only illustrative, not limiting. Associated users may be grouped in any appropriate way. The associated users may also not be grouped. The scope of this disclosure is not limited in this respect.

In some embodiments, the second set of contents may be contents shared by at least one associated user within a predetermined second period of time. The second period of time may have any appropriate duration, such as one day, one week, one month, and so on. The second time period may be the same as or different from the first time period. The second time period may be set by the system or by the user.

In some embodiments, the second set of contents may be provided by at least one second user in response to a system message about sharing content. The system message may be presented on any page of the terminal device of the second user. The system message may prompt the second user to share content at the first time point. In such an embodiment, the second time period may be a time period from the first time point to the current time point.

In some embodiments, the first set of contents and the second set of contents belong to a same type of content posted by different users. For example, the first set of contents and the second set of contents may both belong to composite image contents. In some embodiments, the user 140 (i.e., the first user) and the associated user of the user 140 (i.e., the second user) may receive a system message such as "post a composite image content". The user 140 will post a composite image content for the system message. At least one associated user associated with user 140 will post another composite image content in response to the same system message.

Additionally, or alternatively, in some embodiments, the first set of contents and the second set of contents may also belong to different types of content. Respective contents in the first set may belong to a same type or belong to different types. Respective contents in the second set may belong to s same type or belong to different types. The scope of this disclosure is not limited in this respect.

Several examples of displaying the content shared by the current user and the content shared by the associated user in different domains have been described above. In this way, the content shared by the current user can be clearly distinguished from the content shared by the users followed by the current user. In this way, a user-friendly content presentation page can be provided, and the content presentation effectiveness can be improved. This flexible content presentation scheme can also better meet the needs of users, thereby improving the user experience.

Figure 3:
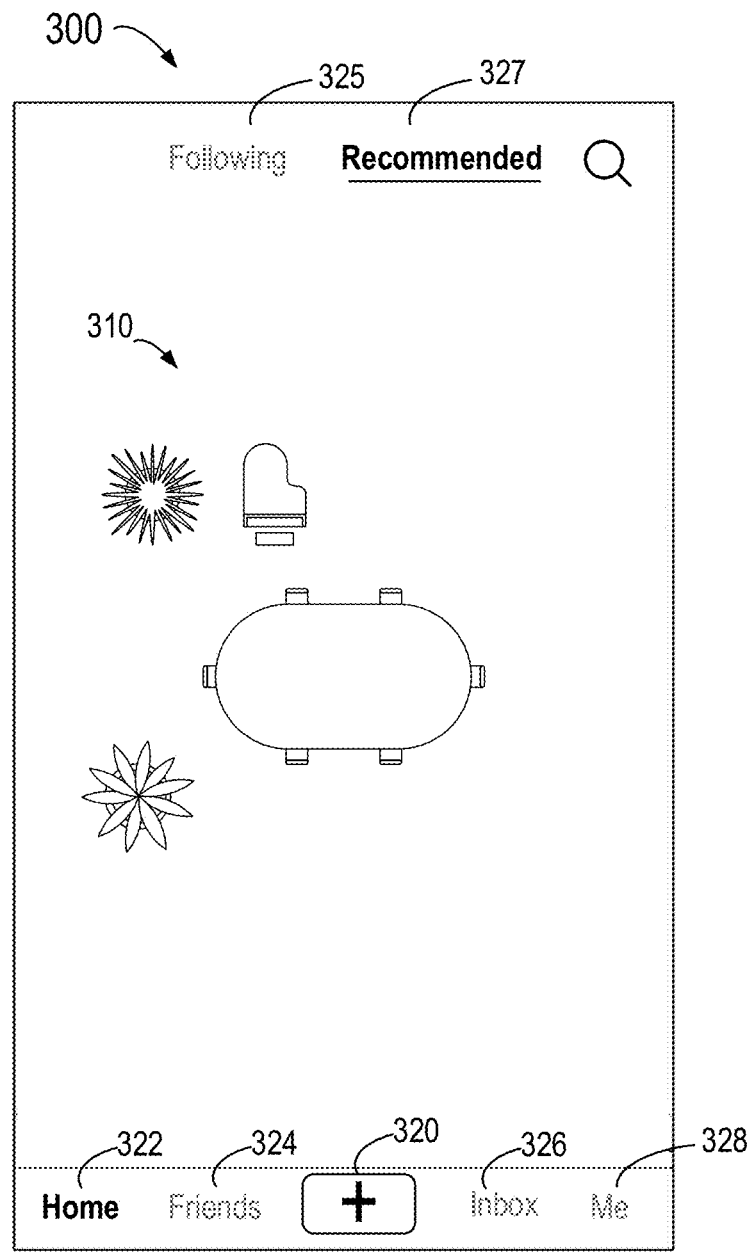
FIG. 3 illustrates a schematic diagram of an example application page according to some embodiments of the present disclosure.

The content presentation scheme according to the present disclosure may be applied to various content sharing applications. FIG. 3 illustrates an example page 300 of an example application 120 according to embodiments of the present disclosure. The page 300 may be any page of the application 120, such as the home page. Contents, such as an image 310, may be presented in the page 300.

A shooting initiating control for the page 300 may be provided for initiating a video shooting activity. Only as an example, the shooting initiating control may be the shooting initiating control 320 presented in the page 300. For example, if the terminal device 110 detects a predetermined operation (e. g., clicking, touching, etc.) on the shooting initiating control 320, the terminal device 110 may initiate the shooting mode to perform image shooting. The application 120 may provide various editing functions for the captured image content. The captured image may be posted or shared by the user 140 via the application 120. Other users may view the content shared by user 140.

Additionally, or alternatively, in some embodiments, the shooting initiating control 320 may not be provided. For example, other tabs, such as the "Now" tab (not shown), may be presented at a location of the shooting initiating control 320. For example, if the user 140 has shared a content, the shooting initiating control 320 may no longer be presented, but a "Now" tab may be presented to indicate that the navigation tab corresponds to a current content presentation page of the application 120.

In addition to the shooting initiating control 320, the page 300 also includes a navigation tab bar for navigating to different pages. A "lower navigation tab bar" located at a lower part of the page 300 includes navigation tabs 322, 324, 326, and 328. The navigation tab 322 has the characters "Home" indicating that the navigation tab corresponds to the home page of application 120; the navigation tab 324 has the characters "Friends" indicating that the navigation tab corresponds to the content presentation page of the application 120; the navigation tab 326 has the characters "Inbox" indicating that the navigation tab corresponds to the inbox page (also referred to as an interactive activity presentation page or a message page) of the application 120; the navigation tab 328 has the character "Me" indicating that the navigation tab corresponds to the user's personal page.

An "upper navigation tab bar" in the upper part of the page 300 includes lower-level navigation tabs of the navigation tab 322, i.e., navigation tabs 325 and 327. The navigation tab 327 has the characters "Recommended" indicating a recommended content page in which recommended content of the application 120 may be presented; the navigation tab 325 has the characters "Following" indicating a following content page in which content of following users may be presented. The page 300 corresponds to the page of the navigation tab "Recommended" 327 under the navigation tab "Home" 322, in which the recommended content, i.e., the image 310 is presented.

In some embodiments, if the application 120 is activated, a page 300 such as that shown in FIG. 3 is entered. In the page 300, the presentation of the content presentation page may be activated by a predetermined operation. An example of a content presentation page will be described with respect to FIGS. 4A to 4H. Examples of predetermined operation for activating a content presentation page include, but are not limited to, touching the navigation tab 324 or pressing the navigation tab 324 for more than a certain period of time, or the like. It is to be understood that, in addition to or as an alternative to the predetermined operations listed above for activating the content presentation page, the activation of the content presentation page may be indicated in other methods. Examples of other methods include, but are not limited to, voice control commands, triggering of hardware keys, specific gestures on specific pages (for example, sliding gestures), and so on. The scope of this disclosure is not limited in this respect.

The above example describes the additional functions provided by the application 120. These functions are only illustrative, not restrictive. The application 120 can provide fewer functions or more abundant functions. These functions make the application 120 rich and interesting, thus improving user participation and experience.

It is to be understood that the example application 120 described with respect to FIG. 3 is only for the purpose of illustration. The content presentation scheme described in the present disclosure may be applied to various applications, and the scope of the present disclosure is not limited in this regard.

It is to be understood that page 300 of FIG. 3 and pages in other drawings to be described below are merely example pages, and various page designs may exist in practice. Various graphical elements in the page may have different arrangements and different visual representations, where one or more of them may be omitted or replaced, and one or more other elements may further exist. The scope of this disclosure is not limited in this respect.

Further examples of content presentation page will be described with respect to FIGS. 4A to 4H below.

Figure 4A:
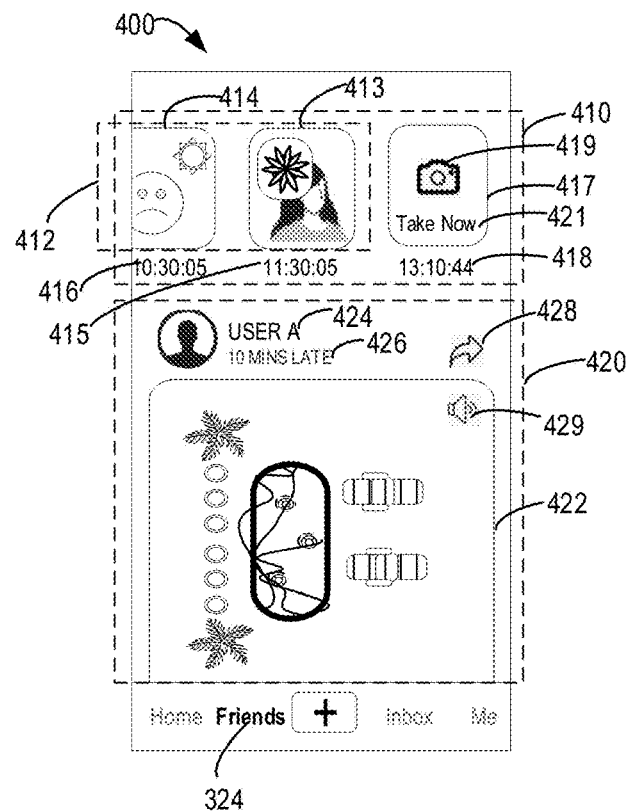
FIGS. 4A to 4H illustrate schematic views of example content presentation pages according to some embodiments of the present disclosure.

FIG. 4A illustrates an example content presentation page 400 according to some embodiments of the present disclosure. The content presentation page 400 may be a page provided by the application 120. The content presentation page 400 includes a first display region 410 and a second display region 420. The first set of contents 412 provided by the user 140 are presented in the first display region 410 in a first size. The first set of contents 412 may include contents 413, contents 414, and possibly a number of contents not shown. The first set of contents may also include only one item. The number of contents included in the first set of contents may be the number of contents shared or provided by the user 140 within a predetermined period of time.

In some embodiments, the first set of contents is presented along a first arrangement orientation. For example, in the example of FIG. 4A, the first arrangement orientation is a landscape orientation. That is, the first set of contents 412 is presented as a landscape sequence. However, in some other embodiments, the first arrangement orientation may also be other appropriate orientations. The first set of contents 412 may also be presented as a sequence arranged in other orientations.

In some embodiments, the first set of contents 412 is sorted at least according to time points at which the first set of contents being provided. For example, the latest shared content may be sorted first. At least a portion of the first set of contents 412 may be presented in the first display region 410 according to the sorting. For example, the content 413 sorted at the top may be displayed in a middle part of the first display region 410. In the illustrated example, the content 413 is a composite image. Next to the content 413, for example, on a left side, the content 414 sorted after the content 413 may be presented. As depicted, the content 414 is a single image. However, it is to be understood that the content 413 and the content 414 may have a type different from the illustrated type.

Additionally, or alternatively, in some embodiments, the first set of contents 412 may also be sorted according to content attributes or content types. For example, different content attributes or types of contents may have predetermined different priorities. The priorities may be set by the system or by the user. Taking the priority of the composite image over other images as an example, the content 413 of the composite image type may be presented in front of the content 414 of other image types. For another example, the content whose content attribute is character may be sorted before the content whose content attribute is landscape. It is to be understood that the sorting methods of different content attributes or types listed above are only illustrative, not restrictive. Any priority setting may be used to sort content of different content attributes or types.

It is to be understood that the listed sorting methods, content types and presentation methods are only illustrative. The disclosure may adopt any rules to sort the first set of contents. Any rules may also be used to determine the presentation position and form of the first set of contents in the first display page according to the sorting.

Additionally, or alternatively, in some embodiments, first time information associated with the time when the first set of contents 412 is provided is presented in association with the first set of contents 412. The first time information may be the time when the content is provided. For example, the time 415 when the content 413 is provided may be displayed below the content 413, such as 11:30:05. Likewise, the time 416 when the content 414 is provided may be presented below the content 414, that is, 10:30:05. Alternatively, or in addition, in embodiments where the user 140 posts content in response to a system message about sharing content, the first time information may also indicate a time difference between the information that the content is provided and the time indicated by the system message. For example, how late (not shown) the content 413 is provided may be presented in addition to the content 413. It is to be understood that the times listed herein are only illustrative, not restrictive. The display format, position, size and the like of the time shown merely exemplary and not limiting. The scope of this disclosure is not limited in this respect.

In some embodiments, additional information may also be presented in association with the first set of contents 412. For example, titles of the first set of contents 412 may be presented. The user 140 may add a title to the shared content. For example, a title "selfie" or other appropriate title may be added to the content 413. The title may be presented for example below the time 415 or at other appropriate locations (not shown). It is to be understood that the titles listed above are only merely exemplary and not limiting. An example of adding a title to the content will be described with respect to FIGS. 4G and 4H.

Additionally, or alternatively, in some embodiments, the additional information associated with the first set of content 412 also includes other user interactions with the first set of content 412. For example, it may illustrate how many users like the content 413, or how many users comment on the content 414, and so on. The additional information listed above is only illustrative. The scope of this disclosure is not limited in this respect.

In some embodiments, in the first display region 410, a first shooting mode activation control is also presented for activating content shooting. For example, the first shooting mode activation control 419 may be presented in a sub area 417 within the first display region 410. If the user 140 clicks or selects the first shooting mode activation control 419, an image shooting mode is activated. In the image capture mode, the content presentation page 400 will be closed, and the image shooting page will be presented. By presenting the shooting mode activation control in the content presentation page 400, the user 140 is provided with a convenient way to enter the image shooting mode.

In some embodiments, in the sub area 417, a text prompt 421, such as "Take Now", is also displayed to prompt the user 140 to shoot. It is to be understood that the text prompt 421 listed herein is only illustrative, not limiting. The text prompt 421 may use different text contents, icons, labels, symbols, languages, etc.

Additionally, or alternatively, in some embodiments, second time information associated with a current time is dynamically presented in association with the first shooting mode activation control 419 in the first display region 410. The second time information may be the current time. For example, the current time 418 may be displayed below the sub region 417. The current time 418 is a continuously changing real-time dynamic time. Additionally, or alternatively, in embodiments where the user 140 shares content in response to a system message about sharing content at a certain time, the second time information may also be how far away the current time is from the time indicated by the system message (not shown). For example, if the time indicated by the system message is 8:00 a.m. and the current time is 8:10 a.m., the second time information may be "00:10:00" or "10 minutes late", and so on. It is to be understood that each time listed above is only illustrative, not limiting.

By displaying the current time, the user 140 can select the desired time to enter the shooting mode. In addition, this changing time can encourage users to share content. This approach of sharing current content can provide more authentic sharing content. In this way, a more friendly and convenient application page may be provided.

Additionally, or alternatively, in some embodiments, the sub region 417 and the current time 418 may be hidden. For example, the user 140 may select to hide the sub region 417 and the current time 418. In such embodiments, the first display region 410 may display more content shared by the user 140.

In some embodiments, if the user 140 has not shared content, only the sub area 417 and/or the current time 418 may be displayed in the second display region. In this way, the user 140 can be reminded to shoot and share the content.

Likewise, in the second display region 420, a second set of contents provided by an associated user of user 140 is presented in a second size. In the example of FIG. 4A, the second size exceeds the first size. The user 140 may view the contents provided by the associated users in a larger size while the content presentation page 400 is opened. In this way, the presentation size of the content shared by the user 140 can be effectively reduced. The user 140 can view the contents shared by users followed by the user 140 in a larger size, so as to better meet the needs of users.

The second set of contents may include content 422 and a number of contents not shown. The second set of contents may also include only one item. The number of contents included in the second set of contents may be the number of contents shared or provided by the associated users of user 140 within a predetermined period of time.

In some embodiments, the second set of contents is presented along a second arrangement orientation. The second arrangement orientation may be different from the first arrangement orientation of the first set of contents. For example, in the example of FIG. 4A, the second arrangement orientation is a portrait orientation. That is, the second set of contents is presented as a portrait sequence. However, in some other embodiments, the second arrangement orientation may also be another appropriate orientation. The second set of contents may also be presented as a sequence arranged in other orientations.

In some embodiments, the second set of contents is sorted at least according to times being provided. For example, a latest shared content may be sorted first. Additionally, or alternatively, in some embodiments, the second set of contents is sorted according to the intimacy degree between the user providing the content and the user 140. For example, the content shared by specially following users or mutual following users of user 140 may be sorted first.

Additionally, or alternatively, in some embodiments, the second set of contents may also be sorted according to content attributes or types. For example, different content attributes or types of content may have predetermined different priorities. The priorities may be set by the system or by the user. Taking the priority of the composite image over other images as an example, the content of the composite image type may be presented in front of the content of other image types. For another example, the content belonging to an image of a character may be sorted before the content belonging to a landscape image. It is to be understood that the sorting methods of different content attributes or types listed above are only illustrative, not limiting. Any priority setting may be used to sort content of different content attributes or types.

In some embodiments, the second set of contents may be sorted according to at least one of the following or any combination of the following: time points at which the contents are provided, an intimacy degree between the second user providing the second set of contents and user 140, content attributes or types of the second set of contents. The scope of this disclosure is not limited in this respect.

At least a portion of the second set of contents may be presented in the second display region 420 according to the sorting of the second set of contents. For example, the content 422 sorted at the top may be displayed in the second display region 420. Although a part of the content 422 is shown in the example of FIG. 4A, it is to be understood that in some embodiments, the whole of the content 422 may be presented in the second display region 420, or alternatively, at least a part of a plurality of contents in the second set of contents may be presented. The second set of contents may be presented in a portrait sequence or other appropriate form. It is to be understood that the listed sorting methods and presentation methods are only illustrative.

In some embodiments, associated users associated with the second set of contents are presented in association with the second set of contents. For example, the username 424, such as "USER A", may be presented above the content 422. It can be shown that the content 422 is provided or shared by user A.

In some embodiments, third time information associated with times when the second set of contents is provided is presented in association with the second set of contents. For example, similar to that of the first set of contents, a specific time when the content is provided may be presented at, for example, the top or other appropriate location of the content 422.

Additionally, or alternatively, in some embodiments, time information of the content 422 being provided may also be presented in other forms. For example, in the example where the associated user posts the content 422 in response to the system message regarding sharing content received at a certain time, how late the time of posting the content is compared with the time of receiving the system message may be shown. Alternatively, how much later the user posts the content than the post time indicated by the system message may be shown. For example, time information 426 of the content 422 being provided, such as "10 minutes late", may be displayed above the content 422. It is to be understood that in the first display region, time information of the first set of contents may also be presented in a similar way, without presenting the specific time when the first set of contents is provided.

It is to be understood that the times listed herein are only illustrative, not limiting. The display format, position, size and the like of the times shown are only exemplary, not limiting. The scope of this disclosure is not limited in this respect.

Additionally, or alternatively, in some embodiments, a repost option 428 for the content 422 may be provided. In other embodiments, the repost option may not be located in the second display region 420 (not shown), or on the content presentation page 400. Hereinafter, the repost option presented in the second display region 420 will be described as an example. If it is detected that the user 140 clicks or selects the repost option 428, it may switch to a content repost page or pop up the content repost window in the current page. The user 140 may repost the link of the content 422 to other users in the content repost page or the content repost window.

In some embodiments, the content 422 is an audio image content. In such embodiments, a sound option 429 for content 422 may be provided. In other embodiments, the sound option may not be located in the second display region 420 (not shown), or in the content presentation page 400. Hereinafter, the sound option presented in the second display region 420 will be described as an example. In some embodiments, the sound of the content 422 is not played by default. If it is detected that the user 140 clicks or selects the sound option 429, the sound of the content 422 may be played. Conversely, in some embodiments, the sound of the content 422 may be played by default. If it is detected that the user 140 clicks or selects the sound option 429, the sound of the content 422 is not played.

It is to be understood that although in FIG. 4A, the first display region 410 is located above the second display region 420, in some embodiments, layouts and positions of the first display region 410 and the second display region 420 may be changed and adjusted. For example, the layouts and locations of the first display region 410 and the second display region 420 may be selected and modified by the user 140. The first display region 410 and the second display region 420 may also be interchanged. The scope of this disclosure is not limited in this respect.

Figure 4B:
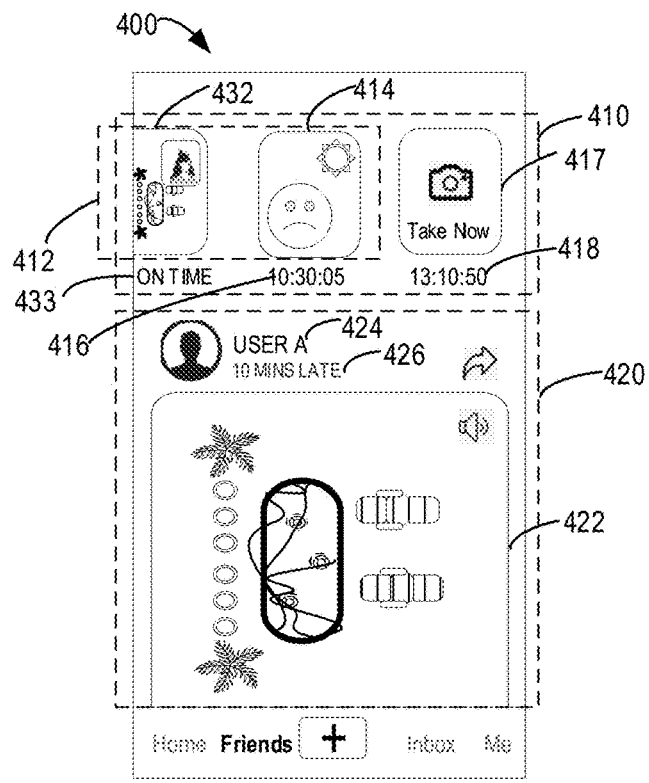

In some embodiments, in response to a predetermined interaction operation along a predetermined orientation for the first display region 410, the presentation of the first set of content 412 in the first display region 410 is switched according to the predetermined orientation and the sorting of the first set of contents. For example, the user 140 may perform a predetermined interactive operation on the content presentation page 400. The predetermined orientation of the predetermined interaction operation for the first display region 410 may correspond to the first arrangement orientation presented by the first group of users in the first display region 410. For example, in the example of FIG. 4A, the predetermined orientation of the predetermined interaction operation may be the landscape orientation. In this example, an example of a predetermined interaction operation includes, but is not limited to, sliding in a landscape orientation or other appropriate orientation to the first display region 410. The first set of sorted contents may be slid accordingly according to the slide operation. For example, if a predetermined operation such as sliding right is performed on the first display region 410, the content presentation page 400 may be changed into the content presentation page 400 in FIG. 4B. In FIG. 4B, at least a portion of the first set of contents 412 presented in the first display region 410 is switched. That is, the content 414 is moved to the middle of the first display region 410. Another content 432 is displayed in the left side of the first display region 410.

In some embodiments, if the first set of contents is provided in response to the system message, and if the content 432 is posted on time according to the system message, a text prompt 433 such as "on time" may be displayed below the content 432. By displaying the text prompt 433, the user 140 can know which sharing is posted on time.

If a predetermined operation such as sliding to the left is performed on the first display region of the content presentation page 400 of FIG. 4B, the content presentation page 400 will change back to the content presentation page 400 shown in FIG. 4A.

Figure 4C:
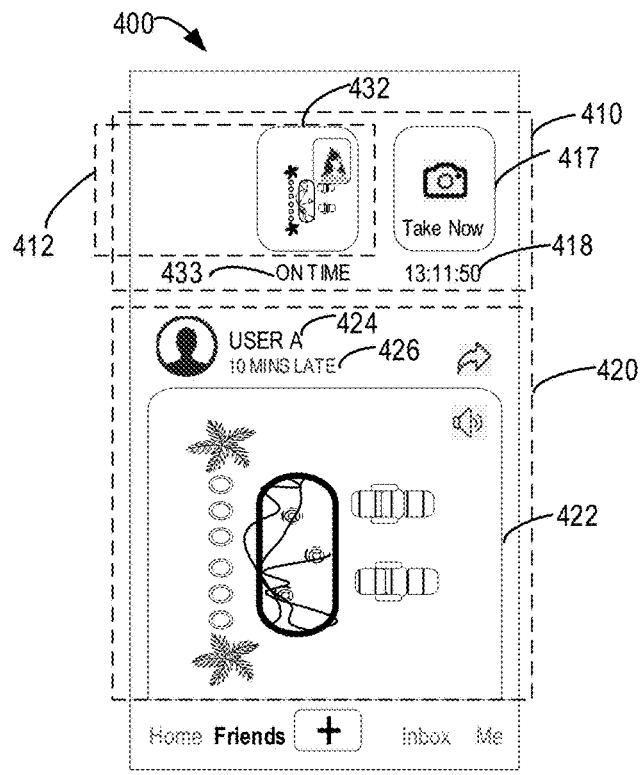

If a predetermined operation such as sliding right is continued to perform on the first display region 410 of the content presentation page 400 of FIG. 4B, the content presentation page 400 will become the content presentation page 400 shown in FIG. 4C. In FIG. 4C, the first display region 410 shows the content 432 shared by the user 140. It is to be understood that although in the example of FIGS. 4A to 4C, the content shared by user 140 includes content 413, content 414, and content 432, this is only exemplary. The content shared by user 140 may have fewer or more numbers of contents.

In some embodiments, the content provided by user 140 in a predetermined period of time (for example, one day, one week, or other appropriate period of time) is displayed in the first display region 410 by default. Alternatively, or in addition, if the user 140 slides to a last content shared within this time period, a more content option such as " . . . " (not shown) may be presented for the user 140 to select to view more contents. If the user 140 selects or clicks the more content option, the content shared by the user 140 at a time other than the predetermined time period may be displayed in the first display region 410.

By presenting a landscape chronological content sequence in the first display region 410, the user 140 can have a clearer time cognition of the content he or she shares, which is easier to understand. This method also makes it easier for user 140 to find some content he or she shares.

Likewise, in some embodiments, in response to a predetermined interaction operation along a predetermined orientation for the second display region 420, the presentation of the second group of content in the second display region 420 is switched according to the predetermined orientation and the sorting of the second group of content. For example, the user 140 may perform a predetermined interactive operation on the content presentation page 400. The predetermined orientation of the predetermined interaction operation for the second display region 420 may correspond to the second arrangement orientation presented by the second set of users in the second display region 420. In embodiments where the arrangement orientation of the first set of content is different from that of the second set of content, the predetermined orientation of the predetermined interaction operation for the second display region 420 is also different from the predetermined orientation of the predetermined interaction operation for the first display region 410. In the example of FIG. 4A, an example of a predetermined interaction operation for the second display region 420 includes, but is not limited to, sliding in a portrait orientation or other appropriate orientation for the second display region 420. The second set of rendered contents may be slid accordingly according to the slide operation.

Figure 4D:
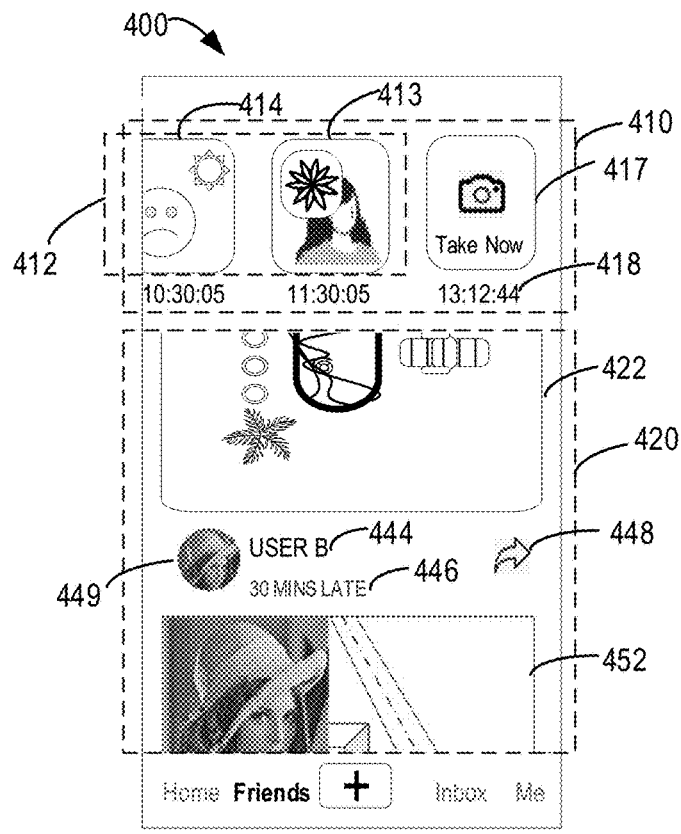

By way of example, if a predetermined operation such as sliding upward is performed on the second display region 420 while the content presentation page 400 of FIG. 4A is presented, the content presentation page 400 may become the content presentation page 400 in FIG. 4D. In FIG. 4D, at least a portion of the second set of contents presented in the second display region 420 is switched. That is, the content 422 is moved up. A portion of the other content 452 is presented by sliding upward below the content 422. Username 444 of the associated user providing the content 452, namely "USER B", may be displayed above the content 452. Time information 446 such as "30 minutes late" may also be displayed above the content 452. Repost options 448 for content 452 may be provided. Additionally, or alternatively, in some embodiments, a profile picture 449 of the associated user who provides the content 452 may also be presented.

If a predetermined interactive operation such as sliding down is performed on the second display region 420 of the content presentation page 400 of FIG. 4D, the content presentation page 400 will change back to the content presentation page 400 shown in FIG. 4A.

Figure 4E:
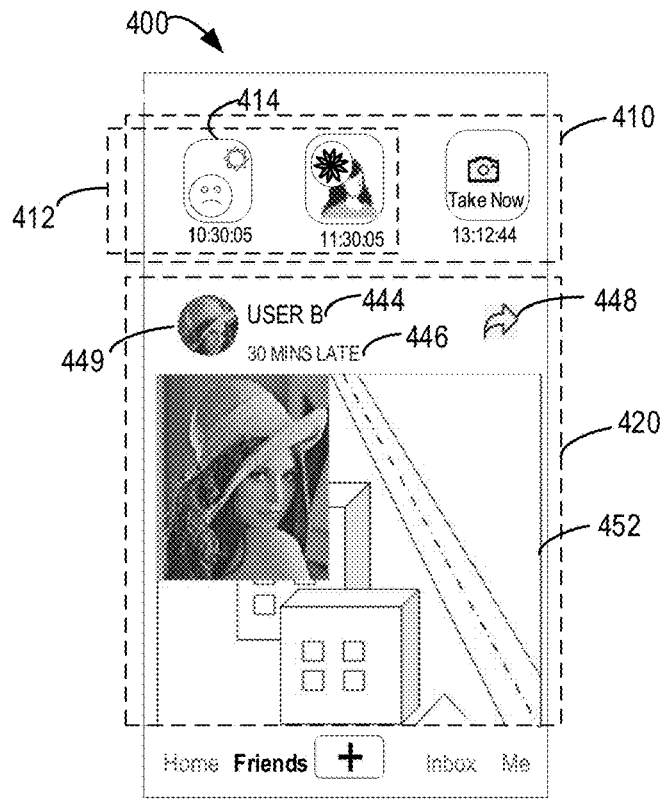

If a predetermined operation such as sliding upward is continued to perform on the second display region 420 of the content presentation page 400 of FIG. 4D, the content presentation page 400 will become the content presentation page 400 shown in FIG. 4E. In FIG. 4E, at least a portion of the content 452 is shown in the second display region 420. It is to be understood that if the second display region 420 continues to slide up, the presentation of the second group of content shared by the associated user may continue to slide. It is to be understood that the content presented in the second display region 420 may also be switched by sliding left and right.

In this way, the user 140 can easily browse the contents shared by users who are followed by the user by presenting, for example, a longitudinal chronological content sequence in the second display region 420. In addition, this method can also improve the exposure rate of the contents shared by the user 140, so as to improve the presentation effect.

It is to be understood that, in addition to or as an alternative to the predetermined interaction operations listed above for switching the presentation content, switching of the presentation content may also be instructed in other ways. Examples of other methods include, but are not limited to, voice control commands, triggering of hardware keys, specific gestures on specific pages (for example, sliding gestures), and so on. The scope of this disclosure is not limited in this respect.

In some embodiments, the longitudinal chronological content sequence presented in the second display region 420 only includes a latest shared content of individual associated users. For example, the content 422 may be the latest content shared by user A. In this case, if a predetermined interactive operation on the content 422 is detected (such as sliding to right or other appropriate operations), the content 422 may be switched to the content shared by user A last time. By presenting only the latest content shared by the associated users that the user 140 follows, the user 140 cannot miss the latest content shared by each associated user.

Additionally, or alternatively, in some embodiments, in response to the second predetermined interaction operation along the second predetermined orientation for the second display region 420, the area occupied by the second display region 420 in the content presentation page 400 may be expanded along the second predetermined orientation. With the expansion of the area occupied by the second display region 420, the area occupied by the first display region 410 in the content presentation page 400 is reduced. The second predetermined orientation may be related to the relative positions of the first display region 410 and the second display region 420. In the embodiment of FIG. 4A where the first display region 410 is located above the second display region 420, the second predetermined orientation may be, for example, upward or other appropriate orientation. The second predetermined interaction operation may be a drag along the upper edge of the second display region 420 or other appropriate location in the second predetermined orientation.

The second predetermined interaction operation and the predetermined interaction operation for switching content in the second display region (also referred to as "the first predetermined interaction operation") may be different operations along the same orientation. For example, the first predetermined interaction operation may be sliding along the right side of the second display region 420, while the second predetermined interaction operation may be sliding along the center of the second display region 420. As another example, the first predetermined operation may be a slide started at any position, and the second predetermined operation may be a press plus slide in the second display region 420. It is to be understood that the various interactive operations listed above are only illustrative, not limiting.

Figure 4F:
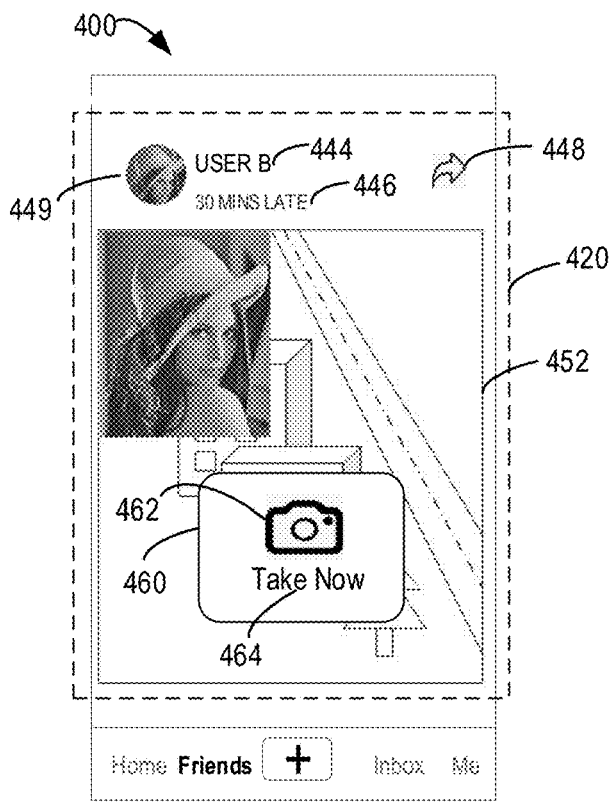

In some embodiments, if a second predetermined interaction operation along the second predetermined orientation for the second display region 420 is detected, the area occupied by the second display region 420 in the content presentation page 400 is expanded along the second predetermined orientation. With the expansion of the area occupied by the second display region 420, the area occupied by the first display region 410 is reduced until the first display region 410 is no longer displayed. In the content presentation page 400 of FIG. 4E, if a second predetermined interaction operation on the second display page 420 is detected, the content presentation page 400 may be changed into the content presentation page 400 of FIG. 4F. In the example of FIG. 4F, only the second display region 420 is shown. If a predetermined interactive operation is performed on the second display region 420 in the case of FIG. 4F, such as sliding, it may turn to the content presentation page 400 in FIG. 4E.

In some embodiments, if it is determined that the area occupied by the first display region 410 in the content presentation page 400 is less than a predetermined threshold, a second shooting mode activation control is also displayed in the expanded second display region 420, as shown in FIG. 4F. The second shooting mode activation control may be used to activate content shooting. The predetermined threshold may be set by the system or by the user. For example, the predetermined threshold may be 0, one tenth of the content presentation page 400, or other appropriate values.

The second shooting mode activation control may at least partially overlap the second set of contents presented in the second display region 420. For example, the second shooting mode activation control 462 may be presented in a pop-up window 460 above the second display region 420. The pop-up window 460 may have a different transparency from the content presented in the second display region 420.

In addition, or alternatively, in some embodiments, the pop-up window 460 also displays a text prompt 464, such as "Take Now", to prompt the user 140 to shoot. It is to be understood that the text prompts 464 listed herein are only illustrative, not limiting. It is to be understood that the second shooting mode activation control may also be presented in a form other than a pop-up window. For example, the second shooting mode activation control may be presented by overlapping the upper part of the content 452 with different transparency. The scope of this disclosure is not limited in this respect. By displaying the second shooting mode activation control in the second display region 420, the user 140 can conveniently enter the shooting mode.

In some embodiments, an exit option (not shown) for the content presentation page 400 may be provided. For example, an exit option may be located at a predetermined location on a content presentation page. If it is detected that the user 140 clicks or selects the exit option, it may exit from the content presentation page 400. For example, it may switch back to a previous page of the application 120.

In some embodiments, it is also possible to provide options such as an option for adding friends, or sharing record option, and so on. For example, associated users may be added or other users may be followed by selecting the option for adding friends. For another example, records of contents shared by user 140 within a certain period of time (for example, one month, one year, and so on) may be viewed by selecting the sharing record option.

In some embodiments, if an editing indication for the content in the first set of contents is detected on the content presentation page 400, an editing interface for the content may be presented in the first display region 410. Examples of predetermined operations directed for editing content include, but are not limited to, clicking or selecting content. In addition to or as an alternative to the predetermined operations listed above for indicating the editing content, the editing content may also be indicated in other ways. Examples of other methods include, but are not limited to, voice control commands, triggering of hardware keys, specific gestures on specific pages (for example, sliding gestures), and so on. The scope of this disclosure is not limited in this respect.

Figure 4G:
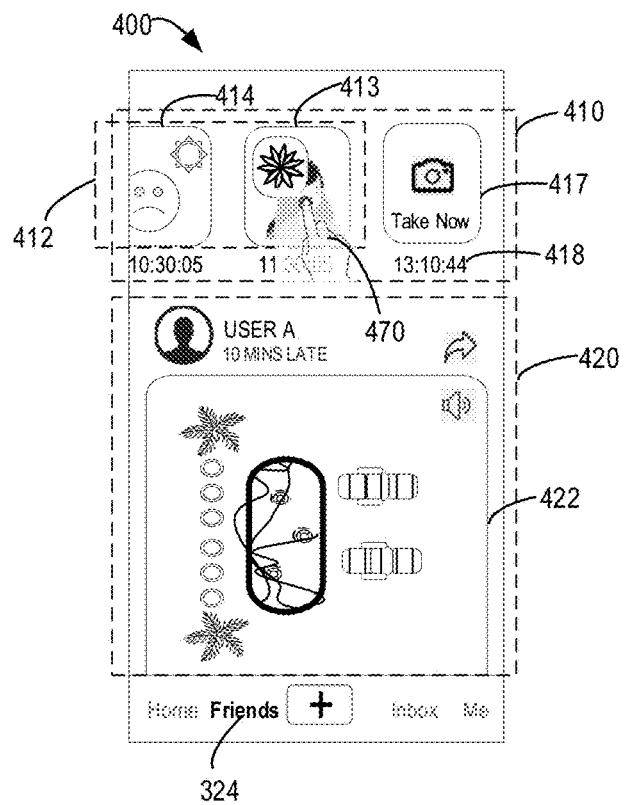
Figure 4H:
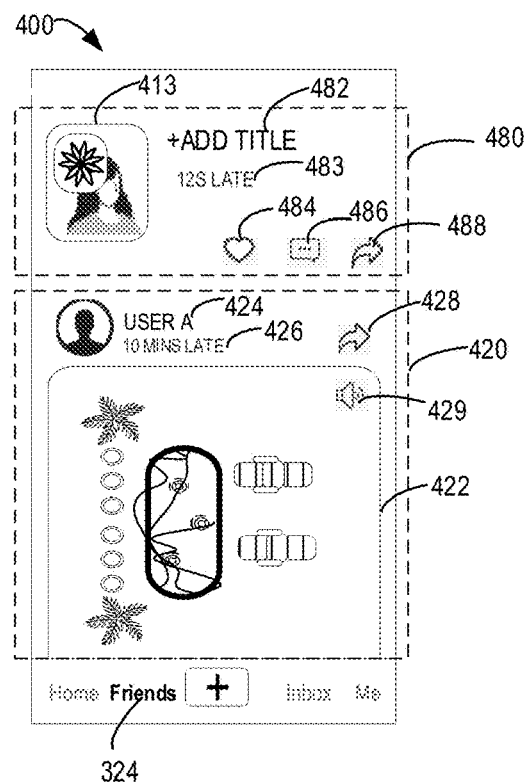

FIG. 4G illustrates detection of an editing indication for the content 413 in the content presentation page 400. For example, touching, clicking, or pressing the content 413 by the user's finger 470 is detected. If this editing indication is detected, the content presentation page 400 will become the content presentation page 400 presented in FIG. 4H. In the content presentation page 400, the editing interface 480 for the content 413 is presented. The editing interface 480 may be included in the first display region 410. The editing interface 480 may also be located at the originally presented position of the first display region 410 or at other appropriate positions.

In some embodiments, the editing interface 480 presents the content 413 and various graphical elements or controls for editing the content 413. For example, the editing interface 480 includes graphical elements 482 for adding titles to content. For example, the graphic element 482 may include a text prompt, such as "add a title" or other appropriate prompts. If a predetermined operation (e. g., clicking, touching, selecting, etc.) on the graphic element 482 is detected, an adding title page may be switched or an add title window may be popped up in the current page. The user 140 may add a title to the content 413 on the adding title page or the adding title window.

The editing interface 480 may also present time information 483 associated with the content 413. For example, time information 483 may indicate that the content 413 is posted "12 seconds later" than the time indicated by the system message indicating content post. The time information 483 may also have other forms. For example, time information 483 may include a specific time when content 413 is posted. As another example, the time information 483 may also indicate how far the current time is apart from the time when the content 413 is posted.

Additionally, or alternatively, in some embodiments, the editing interface 480 presents a graphical element 484 for presenting likes for the content 413. The graphic element 484 may also present the number of times other users like the content 413 (not shown). If a predetermined operation (e. g., clicking, touching, selecting, etc.) on the graphic element 484 is detected, specific likes of the content 413 by other users may be presented in a pop-up window, for example. The editing interface 480 may also present graphical elements 486 for presenting comments in the content 413. The graphic element 486 may also present the number of times (not shown) other users have commented on the content 413. If a predetermined operation (e. g., clicking, touching, selecting, etc.) on the graphic element 486 is detected, detailed comment information of other users on the content 413 may be presented in a pop-up window, for example.

In some embodiments, the editing interface 480 may also present a graphical element 488 for reposting content 413. If a predetermined operation (e. g., clicking, touching, selecting, etc.) on the graphic element 488 is detected, a content repost page may be switched to or a content repost window may be popped up in the current page. The user 140 may repost the link of the content 413 to other users in the content repost page or the content repost window.

In some embodiments, the editing interface 480 may also have more graphical elements, controls, or functions. These graphical elements, controls or functions may be hidden, and the hidden controls or functions may be expanded by a location in the editing interface 480, such as a predetermined operation (e. g., clicking). It is to be understood that the controls or functions shown here are only examples. Different numbers and/or functions of controls may be provided in the editing interface 480. The scope of this disclosure is not limited in this regard.

Additionally, or alternatively, in some embodiments, the content presentation page 400 may also provide more controls or functions. These controls or functions may be hidden, and the hidden controls or functions may be expanded by a certain position in the content presentation page 400 such as a predetermined operation (for example, clicking). It is to be understood that the controls or functions shown here are only examples. Different numbers of controls and/or functions may be provided in the content presentation page 400. The scope of this disclosure is not limited in this regard.

It is to be understood that the content presentation pages 400 of FIGS. 4A to 4H and the pages in other drawings described below are only example pages, and various page designs may exist in practice. Various graphical elements in the page may have different arrangements and visual representations, among which one or more of them may be omitted or replaced. Further, there may exist one or more other elements. The embodiments of the present disclosure are not limited in this regard.

Several examples of the content presentation page 400 have been described above with respect to FIGS. 4A to 4H. In some embodiments, if an activation indication to an interactive activity presentation page of application 120 is detected, the interactive activity presentation page will be presented. For example, if a predetermined operation on the navigation tab 326 is detected while the content presentation page 400 or page 300 is presented, the currently presented page may be exited and the interactive activity presentation page may be initiated. Predetermined operations on the navigation tab 326 include, but are not limited to, selection, clicking or touching of the navigation tab 326, and the like.

It is to be understood that, in addition to or as an alternative to the operations listed above for activating the interactive activity presentation page, the interactive activity presentation page may also be instructed to be activated in other ways. Examples of other methods include, but are not limited to, voice control commands, triggering of hardware keys, specific gestures on specific pages (for example, sliding gestures), and so on. The scope of this disclosure is not limited in this respect.

Figure 5A:
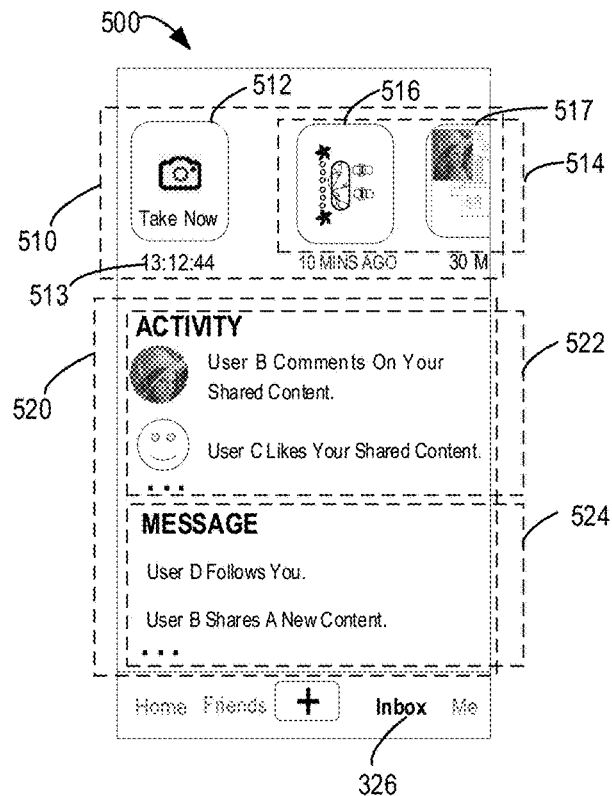
FIGS. 5A to 5B illustrate schematic views of example interactive activity presentation pages according to some embodiments of the present disclosure.
Figure 5B:
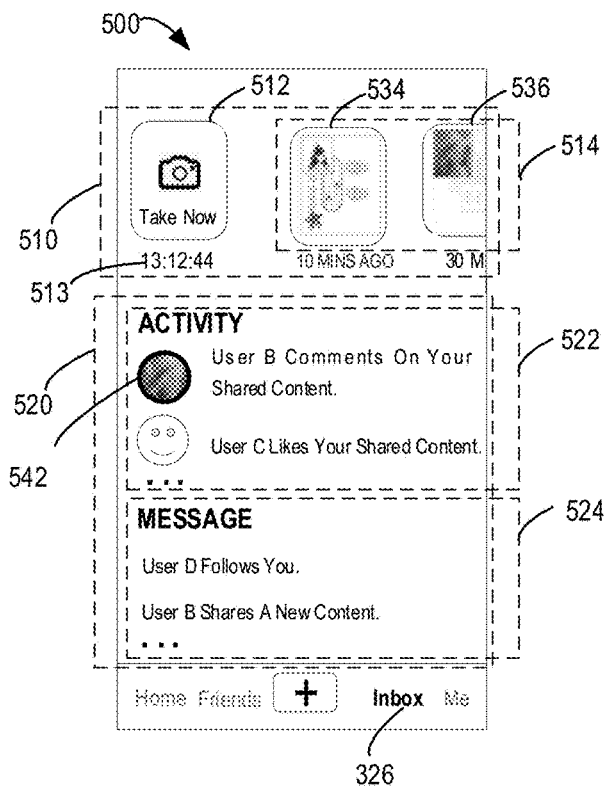

FIGS. 5A and 5B show examples of interactive activity presentation pages 500 according to some embodiments of the present disclosure. As shown in FIG. 5A, the interactive activity presentation page 500 includes a third display region 510 and a fourth display region 520. A second set of contents 514 provided by at least one associated user of user 140 is presented in the third display region 510. For example, the second set of contents 514 includes contents 516, contents 517, and possibly several other contents. Similar to the content presentation page 400, the third display region 510 of the interactive activity presentation page 500 may present, associated with the second set of contents 514, a time point or time information regarding time points at which the second set of contents 514 being provided. The description will not be repeated here.

The user 140 may perform operations on the third display region 510 similar to that of the first display region 410 of the content presentation page 400. The description will not be repeated here. By displaying the content shared by the associated users followed by the user 140 in the third display region 510, the user 140 can see the content shared by other users while viewing the interactive activity information.

Additionally, or alternatively, in some embodiments, in the third display region 510, there is also a third shooting mode activation control for activating content shooting. For example, the third shooting mode activation control may be presented in the sub region 512. Additionally, a text prompt such as "take now" may be displayed. By displaying the third shooting initiating control in the third display region 510, the user 140 can enter the shooting mode to capture content at any time while viewing the interactive activity presentation page 500.

In some embodiments, in the third display region 510, the present time 513 associated with the third shooting mode activation control is also displayed. The current time is a constantly changing real-time dynamic time. By presenting the current time 513, the user 140 can flexibly activate the shooting mode at the time point where shooting is desired.

It is to be understood that although in the third display region 510, the third shooting mode activation control is presented at a left position of the area, this is only exemplary. In some embodiments, the third shooting mode activation control may also be displayed in a right side of the third display region 510 similarly to the first shooting mode activation control in FIG. 4A, or in other appropriate locations. The scope of this disclosure is not limited in this respect.

In some embodiments, in the fourth display region 520 of the interactive activity presentation page 500, interactive activity information between the current user 140 of the application 120 and at least one associated user is displayed. Interactive activity information may include various activity information 522, including but not limited to other users' comments or likes on the content shared by user 140, and other users mentioning user 140 in a certain share or comment, etc. Interactive activity information may also include various messages 524, including but not limited to other users following user 140, a user following user 140 sharing new content, a user not interacting with user 140 for a long time, and so on. It is to be understood that the various interactive activity information listed herein is only illustrative, not restrictive. In the fourth display region 520 of the interactive activity presentation page 500, any kind of interactive activity information may be displayed. The scope of this disclosure is not limited in this respect.

In some embodiments, similar to the second display region 420 of the content presentation page 400, a predetermined interaction operation may be performed to the fourth display region 520, such as sliding up and down to view interactive activity information. Alternately, or additionally, in some embodiments, the area occupied by the fourth display region 520 may be expanded and the area occupied by the third display region 510 may be reduced through predetermined interactive operations.

In some embodiments, the application 120 may include a sharing application based on a rule of "no sharing, no viewing others' sharing". If the user 140 does not share a content, the user 140 may not view a specific content shared by other users, but may only see a blurred image or illustration of the content shared by other users. For example, in the example of FIG. 5B, the content 534 and content 536 shared by other users presented in the third display region 510 are blurred content. In addition, user 140 may not be able to view other users' profile pictures, but may only see other users' blurred profile pictures, such as profile picture 542.

By presenting blurry content and/or blurry profile pictures, the user 140 can be prompted to shoot and post content. By displaying the third shooting mode activation control beside the blurred content, the user 140 can operate more conveniently.

In some embodiments, an exit option (not shown) for the interactive activity presentation page 500 may be provided. For example, an exit option may be located at a predetermined location in the interactive activity presentation page 500. If it is detected that the user 140 clicks or selects the exit option, it may exit from the interactive activity presentation page 500. For example, a previous page of the application 120 may be switched back.

In some embodiments, it is also possible to provide options such as an option for adding friends, sharing record option, and so on. For example, associated users may be added or other users may be followed by selecting the "Add Friends" option. For another example, records of contents shared by the user 140 within a certain period of time (for example, one month, one year, and so on) may be viewed by selecting the sharing record option.

Additionally, or alternatively, in some embodiments, the interactive activity presentation page 500 may also provide more controls or functions. These controls or functions can be hidden, and the hidden controls or functions can be expanded by a certain position in the presentation page 500 through interactive activities such as predetermined operations (for example, clicking). It is to be understood that the controls or functions shown here are only examples. Different numbers of controls and/or functions may be provided in the interactive activity presentation page 500. The scope of this disclosure is not limited in this regard.

Several examples of interactive activity information presentation pages are described above in combination with FIGS. 5A and 5B. By using the interactive activity information page presented with different sub-regions, users can see the content shared by other users while viewing the interactive activity information. In addition, the user can activate the shooting mode while viewing interactive activity information. This kind of interactive activity information presentation page with sub-regions provides a better page display effect, which can improve the user experience.

Figure 6:
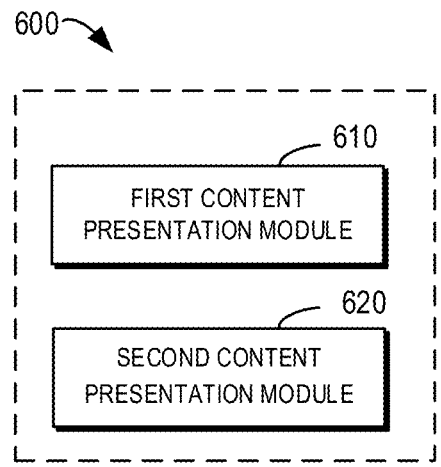
FIG. 6 illustrates a block diagram of an apparatus for content presentation according to some embodiments of the present disclosure.

FIG. 6 illustrates a block diagram of an apparatus 600 for content presentation according to some embodiments of the present disclosure. The apparatus 600 may be implemented at or included in the terminal device 110. Various modules/components of the apparatus 600 may be implemented by hardware, software, firmware or any combinations thereof.

As shown, the apparatus 600 includes a first content presentation module 610 configured to present a first set of contents provided by a first user (for example, user 140) in a first display region (for example, the first display region 410) of a content presentation page (for example, the content presentation page 400) of the application 120 in a first size. The apparatus 600 further includes a second content presentation module 620 configured to present a second set of contents provided by at least one second user in a second display region (for example, the second display region 420) different from the first display region 410 in the content presentation page 400 in a second size different from the first size. The first user and the second user are associated users in the application 120. For example, the first user may be the current user of the application 120. The second user may be a user that the current user has followed in the application 120.

In some embodiments, the first and second sets of contents may belong to contents of a same type posted by different users.

In some embodiments, the first set of contents may include contents shared by the first user within a predetermined first time period. Additionally, or alternatively, in some embodiments, the second set of contents may include contents shared by at least one second user in a predetermined second time period. The first and second time periods may be the same or different.

In some embodiments, the first content presentation module 610 includes a first content sorting module configured to sort the first set of contents at least based on time points at which the first set of contents being provided. The first content presentation module 610 also includes a first set of content presentation modules configured to present, according to the sorting, at least a portion of the first set of contents in the first display region 410.

Additionally, or alternatively, in some embodiments, the second content presentation module 620 includes a second content sorting module configured to sort the second set of contents at least based on time points at which he second set of contents being provided. For example, the second content sorting module may be configured to sort the second set of contents according to at least one of the following: time points at which the second set of contents are provided, an intimacy degree between the first user and the second user providing the second set of contents, or content attributes of the second set of contents. The second content presentation module 620 also includes a second set of contents presentation modules configured to present, according to the sorting, at least a portion of the second set of contents in the second display region 420.

In some embodiments, the first content presentation module 610 is configured to present the first set of contents along a first arrangement orientation. For example, the first set of contents may be presented in a landscape orientation. Alternatively, or additionally, in some embodiments, the second content presentation module 620 is configured to present the second set of contents in a second arrangement orientation different from the first arrangement orientation. For example, the second arrangement orientation may be a portrait orientation.

In some embodiments, the first content presentation module 610 is configured to in response to a predetermined interactive operation along a predetermined orientation for the first display region 410, switch, according to the predetermined orientation and the sorting, a presentation of the first set of contents in the first display region 410. In some embodiments, the predetermined orientation of the predetermined interaction operation for the first display region 410 corresponds to a first arrangement orientation at which of the first set of contents being presented. The predetermined orientation of the predetermined interaction operation for the second display region 420 corresponds to a second arrangement orientation at which the second set of contents being presented. In other words, the predetermined orientation of the predetermined interaction operation for the first display region 410 is different from the predetermined orientation of the predetermined interaction operation for the second display region 420.

In some embodiments, the second content presentation module 620 is configured to in response to a predetermined interactive operation along a predetermined orientation for the second display region 420, switch, according to the predetermined orientation and the sorting, a presentation of the second set of contents in the second display region 420.

In some embodiments, the apparatus 600 further includes a time presentation module configured to present, in the first display region 410, first time information in association with the first set of contents, the first time information being associated with time points at which the first set of contents are provided.

In some embodiments, the apparatus 600 also includes a first shooting mode activation control presentation module configured to present, in the first display region 410, a first shooting mode activation control for activating content shooting. Additionally, or alternatively, in some embodiments, the apparatus 600 further includes a current time presentation module configured to dynamically present, in the first display region 410, second time information associated with a current time in association with the first shooting mode activation control.

In some embodiments, the apparatus 600 further includes a second predetermined operation response module configured to expand, along the second predetermined orientation, an area occupied by the second display region 420 in the content presentation page 400; and reduce an area occupied by the first display region 410 in the content presentation page 400 with the expansion of the area occupied by the second display region 420.

In addition, or alternatively, in some embodiments, the apparatus 600 further includes a second shooting mode activation control presentation module configured to in accordance with a determination that the area occupied by the first display region 410 in the content presentation page 400 is less than a predetermined threshold, present, in the expanded second display region 420, a second shooting mode activation control for activating content shooting. In some embodiments, the second shooting mode activation control at least partially overlaps the second set of content presented in the second display region 420. For example, the second shooting mode activation control may be presented in a pop-up window 460 that at least partially overlaps the second set of contents.

In some embodiments, the apparatus 600 further includes an editing interface presentation module configured to in response to an editing indication for a content of the first set of contents, present an editing interface for the content in the first display region 410. In some embodiments, the editing interface presentation module is configured to present at least one of the following: a graphic element for adding a title to the content, a graphic element for presenting likes or comments on the content, or a graphic element for reposting the content.

In some embodiments, the apparatus 600 further includes an interactive activity presentation page presentation module configured to in response to an activation indication of an interactive activity presentation page of the application 120 (for example, the interactive activity presentation page 500), present the second set of contents provided by at least one associated user in the third display region of the interactive activity presentation page. The interactive activity presentation page presentation module is further configured to present, in a fourth display region of the interactive activity presentation page different from the third display region, interactive activity information between a current user of the application 120 and the at least one associated user.

In some embodiments, the apparatus 600 further includes a third shooting mode activation control presentation module configured to present, in the third display region, a third shooting mode activation control for activating content shooting. Additionally, or alternatively, in some embodiments, the apparatus 600 further includes a second current time presentation module configured to present, in the third display region, a current time in association with the third shooting mode activation control.

Figure 7:
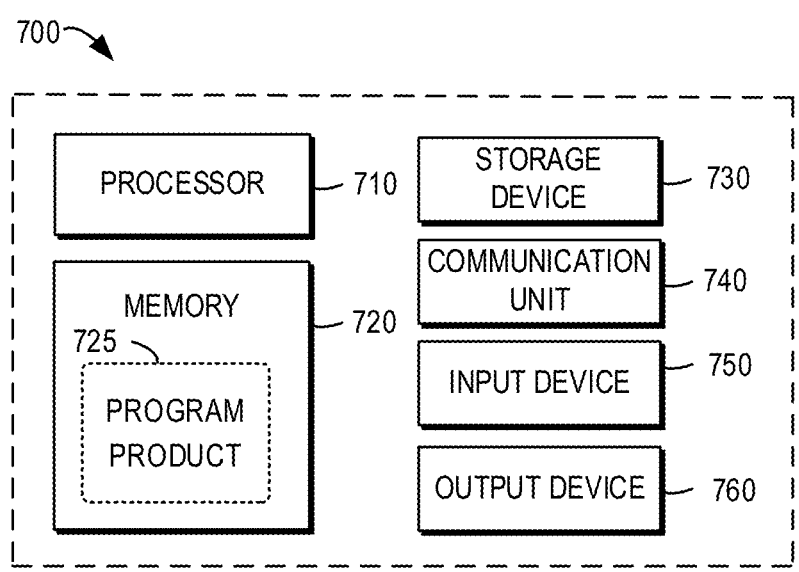
FIG. 7 illustrates an electronic device in which one or more embodiments of the present disclosure can be implemented.

FIG. 7 illustrates a block diagram of an electronic device 700 in which one or more embodiments of the present disclosure may be implemented. It is to be understood that the electronic device 700 shown in FIG. 7 is merely provided as an example, without suggesting any limitation to the functionalities and scope of the embodiments described herein. The electronic device 700 shown in FIG. 7 may be used to implement the terminal device 110 of FIG. 1.

As shown in FIG. 7, the electronic device 700 is in the form of a general-purpose electronic device. Components of electronic device 700 may include, but are not limited to, one or more processors or processing units 710, a memory 720, a storage devices 730, one or more communication units 740, one or more input devices 750, and one or more output devices 760. The processing unit 710 may be a real or virtual processor and can perform various processes according to programs stored in the memory 720. In a multi-processor system, a plurality of processing units execute computer executable instructions in parallel to improve the parallel processing capability of the electronic device 700.

The electronic device 700 typically includes a plurality of computer storage media. Such media may be any available media accessible by electronic device 700, including but not limited to, volatile and non-volatile media, detachable and non-detachable media. The memory 720 may be volatile memory (such as register, cache, random access memory (RAM)), non-volatile memory (such as read-only memory (ROM), electrically erasable programmable read-only memory (EEPROM), flash memory), or some combination thereof. The storage device 730 may be a detachable and non-detachable medium, and may include a machine-readable medium, such as a flash drive, a disk, or any other medium, which may be used to store information and/or data (e. g., training data for training) and may be accessed within the electronic device 700.

The electronic device 700 may further include additional detachable/non-detachable, volatile/non-volatile storage media. Although not shown in FIG. 7, there may be provided a disk drive for reading from or writing into a detachable and non-volatile disk (e.g., a floppy disk), and an optical disk drive for reading from and writing into a detachable non-volatile optical disk. In such cases, each drive may be connected to a bus (not shown) via one or more data medium interfaces. The memory 720 may include a computer program product 725 having one or more program modules configured to perform various methods or actions of various embodiments of the present disclosure.

The communication unit 740 implements communication with another computing device via the communication medium. Additionally, the functions of the components of the electronic device 700 may be implemented by a single computing cluster or a plurality of computing machines that can communicate with each other via communication connections. Thus, electronic device 700 may operate in a networked environment using a logic connection with one or more other servers, network personal computers (PCs), or further general network nodes.

The input device 750 may be one or more input devices, such as a mouse, a keyboard, a trackball, and the like. The output device 760 may be one or more output devices, such as a display, a speaker, a printer, and the like. By means of the communication unit 740, the electronic device 700 may further communicate with one or more external devices (not shown) such as storage devices and display devices, one or more devices that enable the user to interact with the electronic device 700, or any devices (such as a network card, a modem and the like) that enable the electronic device 700 to communicate with one or more other electronic devices, if required. Such communication may be performed via an input/output (I/O) interface (not shown).

The electronic device 700 may also be provided with a camera. The camera may communicate with other components of the electronic device 700 or with external devices through the communication unit 740 as required.

According to example implementations of the present disclosure, there is provided a computer-readable storage medium with computer-executable instructions stored thereon, wherein the computer-executable instructions are executed by a processor to realize the methods described above. According to example implementations of the present disclosure, there is further provided there is provided a computer program product tangibly stored on a non-transient computer-readable medium and comprising computer-executable instructions which are executed by a processor to realize the methods described above.

Aspects of the present disclosure are described herein with reference to flowchart illustrations and/or block diagrams of methods, apparatus (systems), and computer program products according to implementations of the present disclosure. It will be understood that each block of the flowchart illustrations and/or block diagrams, and combinations of blocks in the flowchart illustrations and/or block diagrams, can be implemented by computer-readable program instructions.

These computer readable program instructions may be provided to a processing unit of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

What is claimed is:

1. A method of content presentation, comprising:
presenting, in a first display region of a content presentation page of an application, at least a portion of a first set of content items along a first arrangement orientation; and
presenting, in a second display region of the content presentation page of the application different from the first display region, at least a portion of a second set of content items along a second arrangement orientation different from the first arrangement orientation.

2. The method of claim 1, further comprising:
in response to a predetermined interactive operation along a predetermined orientation for the first or second display region, slidingly presenting the first set of content items or the second set of content items based on the predetermined orientation and a sorting of the first set of content items or the second set of content items.

3. The method of claim 2, wherein the sorting of the first set of content items is determined at least based on time points at which the first set of content items being provided by a first user.

4. The method of claim 2, wherein the sorting of the second set of content items is determined based on at least one of:
time points at which the second set of content items are provided,
an intimacy degree between a first user associated with the first set of content items and at least one second user providing the second set of content items, or
content attributes of the second set of content items.

5. The method of claim 2, wherein:
a predetermined orientation of the predetermined interaction operation for the first display region corresponds to the first arrangement orientation, and
a predetermined orientation of the predetermined interaction operation for the second display region corresponds to the second arrangement orientation.

6. The method of claim 2, wherein slidingly presenting the first set of content items or the second set of content items comprises:

slidingly removing the presented portion of the first set of content items or the second set of content items along the predetermined orientation from the first or second display region; and slidingly presenting another portion of the first set of content items or the second set of content items in the first or second display region along the predetermined orientation.

7. The method of claim 1, further comprising:
in response to a second predetermined interactive operation along a second predetermined orientation for the second display region,
- extending, along the second predetermined orientation, an area occupied by the second display region in the content presentation page; and
- reducing an area occupied by the first display region in the content presentation page with the expansion of the area occupied by the second display region.

8. The method of claim 7, further comprising:
in accordance with a determination that the area occupied by the first display region in the content presentation page is less than a predetermined threshold, presenting, in the expanded second display region, a second shooting mode activation control for activating content shooting.

9. The method of claim 8, wherein the second shooting mode activation control at least partially overlaps the second set of content items presented in the second display region.

10. The method of claim 1, further comprising:
presenting, in the first display region, first time information in association with the first set of content items, the first time information being associated with time points at which the first set of content items are provided.

11. The method of claim 1, further comprising:
presenting, in the first display region, a first shooting mode activation control for activating a content shooting.

12. The method of claim 11, further comprising:
dynamically presenting, in the first display region, second time information associated with a current time in association with the first shooting mode activation control.

13. The method of claim 1, further comprising:
in response to an editing indication for a content item of the first set of content items, presenting an editing interface for the content item in the first display region.

14. The method of claim 13, wherein the editing interface for the content item is presented with at least one of the following:
- a graphic element for adding a title to the content item,
- a graphic element for presenting likes or comments on the content item,
- a graphic element for reposting the content item.

15. The method of claim 1, further comprising:
in response to an activation indication of an interactive activity presentation page of the application, presenting the second set of content items provided by at least one associated user in a third display region of the interactive activity presentation page; and
presenting, in a fourth display region of the interactive activity presentation page different from the third display region, interactive activity information between a current user of the application and the at least one associated user.

16. The method of claim 15, further comprising:
presenting, in the third display region, a third shooting mode activation control for activating content shooting; and
presenting, in the third display region, a current time in association with the third shooting mode activation control.

17. The method of claim 1, wherein the first set of content items is posted by a first user, and the second set of content items is posted by at least one second user followed by the first user in the application.

18. The method of claim 1, wherein the first set of content items and the second set of content items belong to content items of a same type posted by different users.

19. An electronic device, comprising:
at least one processing unit;
a first camera and a second camera; and
at least one memory, coupled to the at least one processing unit and storing instructions to be executed by the at least one processing unit, the instructions, when executed by the at least one processing unit, causing the electronic device to:
- present, in a first display region of a content presentation page of an application, at least a portion of a first set of content items along a first arrangement orientation; and
- present, in a second display region of the content presentation page of the application different from the first display region, at least a portion of a second set of content items along a second arrangement orientation different from the first arrangement orientation.

20. A non-transitory computer-readable storage medium, with a computer program stored thereon, the computer program being executable by a processor to implement a method of content presentation, the method comprising:
presenting, in a first display region of a content presentation page of an application, at least a portion of a first set of content items along a first arrangement orientation; and
presenting, in a second display region of the content presentation page of the application different from the first display region, at least a portion of a second set of content items along a second arrangement orientation different from the first arrangement orientation.

* * * * *